United States Patent
Lee et al.

(10) Patent No.: US 8,180,853 B2
(45) Date of Patent: May 15, 2012

(54) METHOD AND APPARATUS FOR TRANSMITTING DATA IN A PEER-TO-PEER NETWORK

(75) Inventors: Sang-kwon Lee, Suwon-si (KR); Hyok-sung Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 11/865,585

(22) Filed: Oct. 1, 2007

(65) Prior Publication Data

US 2008/0256175 A1 Oct. 16, 2008

(30) Foreign Application Priority Data

Apr. 16, 2007 (KR) .................. 10-2007-0037103

(51) Int. Cl.
*G06F 15/16* (2006.01)
(52) U.S. Cl. ......... 709/218; 709/204; 709/223; 709/231
(58) Field of Classification Search .................. None
See application file for complete search history.

(56) References Cited

U.S. PATENT DOCUMENTS

| | | | | |
|---|---|---|---|---|
| 5,195,181 | A * | 3/1993 | Bryant et al. ................. | 709/215 |
| 6,029,175 | A * | 2/2000 | Chow et al. ................. | 707/104.1 |
| 6,122,753 | A * | 9/2000 | Masuo et al. ..................... | 714/4 |
| 6,185,598 | B1 * | 2/2001 | Farber et al. ................. | 709/200 |
| 6,542,964 | B1 * | 4/2003 | Scharber ........................ | 711/122 |
| 6,646,989 | B1 * | 11/2003 | Khotimsky et al. ........... | 370/238 |
| 6,816,891 | B1 * | 11/2004 | Vahalia et al. ................ | 709/214 |
| 6,938,095 | B2 * | 8/2005 | Basturk et al. ................ | 709/238 |
| 7,020,698 | B2 * | 3/2006 | Andrews et al. .............. | 709/223 |
| 7,035,907 | B1 * | 4/2006 | Decasper et al. .............. | 709/212 |
| 7,136,927 | B2 * | 11/2006 | Traversat et al. ............. | 709/230 |
| 7,174,382 | B2 * | 2/2007 | Ramanathan et al. ........ | 709/227 |
| 7,315,900 | B1 * | 1/2008 | Ofelt et al. ..................... | 709/238 |
| 7,333,482 | B2 * | 2/2008 | Johansson et al. ............ | 370/353 |
| 7,500,014 | B1 * | 3/2009 | Jacobson et al. .............. | 709/239 |
| 7,512,943 | B2 * | 3/2009 | Hester et al. .................. | 717/177 |
| 7,558,875 | B2 * | 7/2009 | Zhang et al. .................. | 709/238 |
| 7,571,251 | B2 * | 8/2009 | Bowman ....................... | 709/242 |
| 7,849,145 | B2 * | 12/2010 | Kang et al. .................... | 709/206 |
| 7,953,083 | B1 * | 5/2011 | Evans et al. ................... | 370/390 |
| 2002/0049760 | A1 * | 4/2002 | Scott et al. ...................... | 707/10 |
| 2002/0073204 | A1 * | 6/2002 | Dutta et al. .................... | 709/227 |
| 2002/0124080 | A1 * | 9/2002 | Leighton et al. .............. | 709/224 |
| 2002/0152299 | A1 * | 10/2002 | Traversat et al. ............. | 709/223 |
| 2002/0165979 | A1 * | 11/2002 | Vincent ......................... | 709/239 |
| 2002/0184128 | A1 * | 12/2002 | Holtsinger ...................... | 705/35 |
| 2002/0184310 | A1 * | 12/2002 | Traversat et al. ............. | 709/204 |
| 2002/0194108 | A1 * | 12/2002 | Kitze .............................. | 705/37 |

(Continued)

FOREIGN PATENT DOCUMENTS

JP 2003-223378 A 8/2003
(Continued)

*Primary Examiner* — Ian N Moore
*Assistant Examiner* — Dung B Huynh
(74) *Attorney, Agent, or Firm* — Sughrue Mion, PLLC

(57) ABSTRACT

An apparatus for transmitting data which includes a management unit that manages network-topology information of clients participating in the P2P service, and an interface unit that provides to a first client a peer list including information of a client having the minimum network distance to the first client, based on the network topology information, when receiving a request for content from the first client.

17 Claims, 10 Drawing Sheets

U.S. PATENT DOCUMENTS

| | | |
|---|---|---|
| 2003/0009587 A1* | 1/2003 | Harrow et al. ............... 709/238 |
| 2003/0028610 A1* | 2/2003 | Pearson ........................ 709/213 |
| 2003/0065774 A1* | 4/2003 | Steiner et al. ................ 709/225 |
| 2003/0131129 A1* | 7/2003 | Becker et al. ................ 709/238 |
| 2003/0145093 A1* | 7/2003 | Oren et al. ................... 709/229 |
| 2003/0174648 A1* | 9/2003 | Wang et al. .................. 370/235 |
| 2003/0208621 A1* | 11/2003 | Bowman ....................... 709/242 |
| 2003/0233281 A1* | 12/2003 | Takeuchi et al. ............... 705/26 |
| 2003/0233455 A1* | 12/2003 | Leber et al. .................. 709/226 |
| 2004/0143666 A1* | 7/2004 | Xu et al. ...................... 709/227 |
| 2004/0213233 A1* | 10/2004 | Hong et al. ................... 370/392 |
| 2005/0044147 A1* | 2/2005 | Yap .............................. 709/205 |
| 2005/0157659 A1 | 7/2005 | Huitema |
| 2006/0064476 A1* | 3/2006 | Decasper et al. ............. 709/223 |
| 2006/0095402 A1* | 5/2006 | Lee et al. ......................... 707/1 |
| 2006/0098987 A1* | 5/2006 | Hoshida ....................... 398/147 |
| 2006/0126201 A1* | 6/2006 | Jain ................................ 360/15 |
| 2006/0168104 A1* | 7/2006 | Shimizu et al. .............. 709/218 |
| 2006/0173855 A1* | 8/2006 | Turner et al. .................. 707/10 |
| 2006/0206621 A1* | 9/2006 | Toebes et al. ................ 709/238 |
| 2006/0224757 A1* | 10/2006 | Fang et al. ................... 709/231 |
| 2006/0230107 A1* | 10/2006 | Yu et al. ....................... 709/204 |
| 2006/0294053 A1* | 12/2006 | Kojima ............................ 707/1 |
| 2007/0028133 A1* | 2/2007 | Izutsu et al. ..................... 714/4 |
| 2007/0140140 A1* | 6/2007 | Feeley et al. ................. 370/252 |
| 2008/0040482 A1* | 2/2008 | Twiss et al. .................. 709/226 |
| 2008/0065724 A1* | 3/2008 | Seed et al. ................... 709/203 |
| 2008/0144510 A1* | 6/2008 | Harrabida et al. ........... 370/236 |
| 2008/0177873 A1* | 7/2008 | Ni et al. ....................... 709/223 |
| 2008/0235331 A1* | 9/2008 | Melamed et al. ............ 709/204 |
| 2009/0222890 A1* | 9/2009 | Kang et al. ........................ 726/3 |
| 2010/0011103 A1* | 1/2010 | Luzzatti et al. .............. 709/226 |
| 2010/0064049 A1* | 3/2010 | Magharei et al. ............ 709/229 |

FOREIGN PATENT DOCUMENTS

| | | |
|---|---|---|
| KR | 10-2005-0002456 A | 1/2005 |
| KR | 10-2006-0015313 A | 2/2006 |

* cited by examiner

METHOD AND APPARATUS FOR TRANSMITTING DATA IN A PEER-TO-PEER NETWORK

CROSS-REFERENCE TO RELATED APPLICATION

This application claims priority from Korean Patent Application No. 10-2007-0037103 filed on Apr. 16, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a method and apparatus for transmitting data, and more particularly, to methods and apparatus for transmitting data, which can improve the download speed in a peer-to-peer (P2P) network.

2. Description of the Related Art

Peer-to-Peer (P2P) communication refers to the sharing of files between individuals connected via the Internet, and all participants of the communication become both a provider and a user at the same time.

There are two types of peer-to-peer communications. One type connects individuals with the help of a server, and the other type connects individuals by sharing personal information such as an IP address in advance. In the first type, after the connection and retrieval step, individuals directly share and exchange information as in the second type.

FIG. 1 illustrates the configuration of a system for downloading multimedia content based on a related art P2P method.

As illustrated, the P2P-providing system includes a web server 100, a P2P server 200, and multiple P2P clients 250.

The web server 100 helps P2P clients 250 download content. For this, the P2P server 200 can manage P2P clients 250 sharing certain files.

The P2P client 250 can download content from other P2P clients 250 using information provided by the P2P server 200. For this, the P2P client 250 connects to the web server 100, and then retrieves content to be downloaded. Then, the P2P client 250 obtains the URL address of the P2P server 200 from the metadata of the retrieved content, and connects to the P2P server 200. Next, the P2P server 200 provides to the P2P client the list of other P2P clients (hereinafter, called a "peer list") sharing content to be downloaded. Then, the P2P client 250 can connect to the P2P clients 250 included in the peer list, and download desired content.

However, the related art P2P server 200 does not consider the network state or routing information between P2P clients 250, and generates a peer list by arbitrarily extracting P2P clients 250. Hence, in the case where the network environment between P2P clients 250 is poor, or their distance is far, the download speed is lowered, which is a problem.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention there is provided an apparatus and method for transmitting data, which can improve the download speed in a peer-to-peer (P2P) network.

According to an exemplary embodiment of the present invention, there is provided an apparatus for transmitting data, the apparatus including a management unit that manages network-topology information of clients participating in the P2P service, and an interface unit that provides to a first client a peer list including information of a client having the minimum network distance to the first client, based on the network topology information, when receiving a request for content from the first client.

According to an exemplary embodiment of the present invention, there is provided an apparatus for transmitting data, the apparatus including a management unit that manages network-topology information of clients participating in the P2P service, a path-retrieving unit that retrieves a shortest path between a first client that belongs to a first autonomous network which has sent a request for content, and a second client that belongs to a second autonomous network which shares the content, with reference to the result of measuring the data-transmission speed, and an interface unit that provides a peer list including the shortest path to the first client.

According to an exemplary embodiment of the present invention, there is provided a method of transmitting data, the method including managing network-topology information of clients participating in the P2P service, providing to a first client a peer list including information of a client having the minimum network distance to a first client, based on the network-topology information when receiving a request for content from the first client.

According to an exemplary embodiment of the present invention, there is provided a method of transmitting data, the method including managing network-topology information of clients participating in the P2P service according to the autonomous network to which the client belongs, retrieving the shortest path between a first client that belongs to a first autonomous network which has sent a request for content, and a second client that belongs to a second autonomous network which shares the content with reference to the result of measuring the data-transmission speed, providing a peer list including the shortest path to the first client.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE INVENTION

Figure 1:
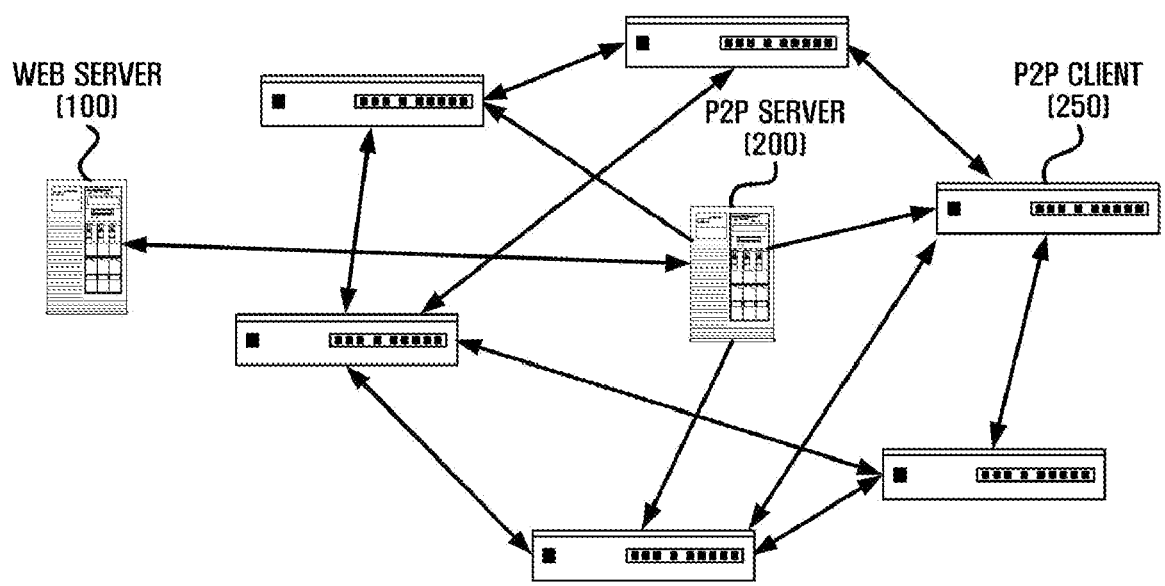
FIG. 1 illustrates the configuration of the related art P2P system.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
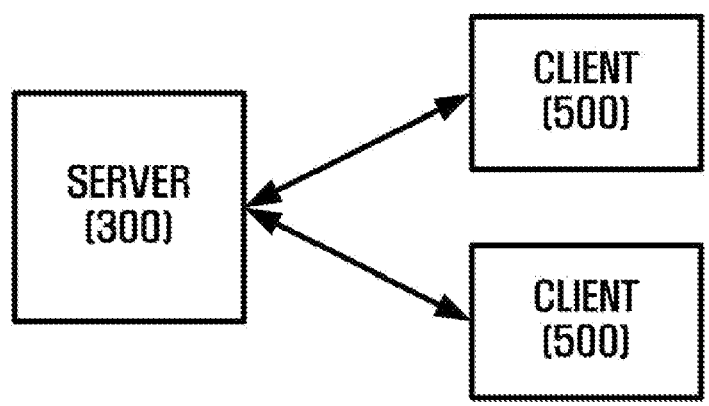
FIG. 2 illustrates the configuration of a P2P system according to an exemplary embodiment of the present invention.

FIG. 2 illustrates a P2P system according to an exemplary embodiment of the present invention.

As illustrated, the P2P system according to an exemplary embodiment of the present invention includes a server and a client (peer).

The server 300 can manage network topology information between autonomous systems. Further, the server 300 can manage information on all clients 500 participating in the P2P service. Here, the server 300 can manage information on each client 500 using autonomous networks. In the case where a certain client 500 sends a request for content, the server 300 generates a peer list including information of the client 500 having requested the content, and clients 500 sharing the content whose network distance is a minimum, and provides the list to the client 500 that requested the content. The server 300 will be described in more detail later with reference to FIGS. 3 and 4.

The client 500 can connect to the server 300 and send a request for content, and can receive the peer list provided by the server 300. If the peer list is provided by the server 300, the client 500 can connect to the clients 500 included in the peer list, and obtain necessary content. The client 500 will be described in more detail with reference to FIG. 5.

Figure 3:
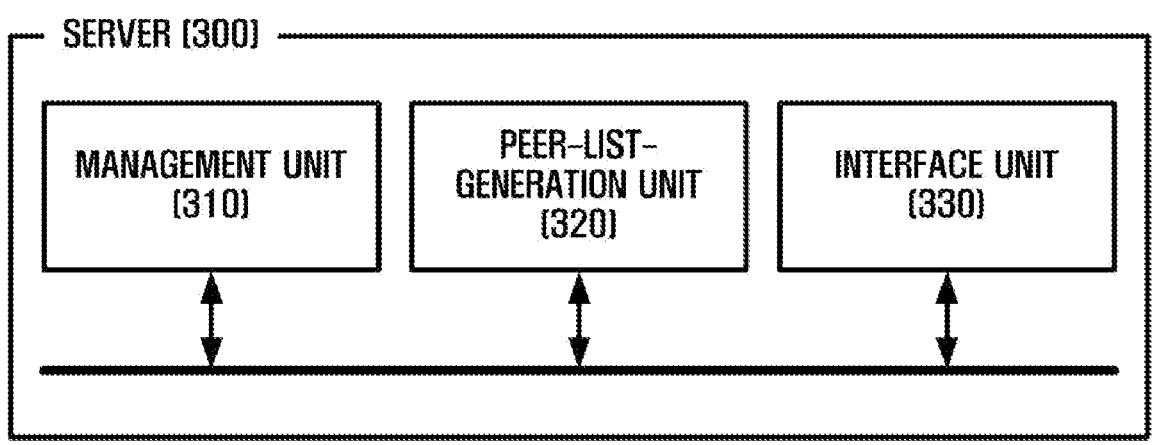
FIG. 3 illustrates the configuration of a server according to an exemplary embodiment of the present invention.

FIG. 3 illustrates the configuration of the server 300 according to an exemplary embodiment of the present invention. As illustrated, the server 300 includes a management unit 300, a peer-list-generation unit 320, and an interface unit 330.

The management unit 310 can manage information of all clients 500 currently participating in the P2P service, and network topology information between autonomous networks. Here, the network topology information refers to connection-structure information between autonomous networks on the Internet.

Figure 4:
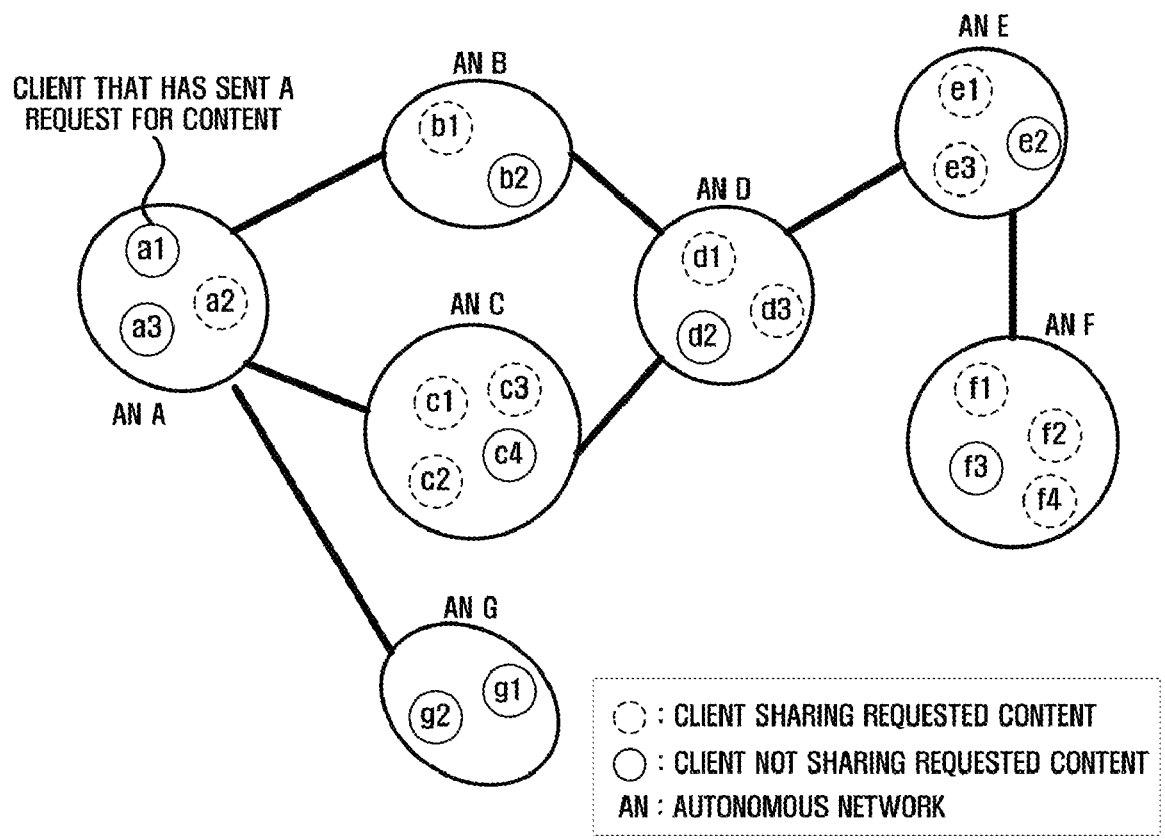
FIG. 4 illustrates a method of calculating a network distance according to an exemplary embodiment of the present invention.

FIG. 4 illustrates a connection structure between multiple autonomous networks. Referring to FIG. 4, autonomous network A is connected to autonomous networks B and C, respectively, and network B is connected to networks A and D, respectively. Further, network C is connected to networks A and D, respectively, and network D is connected to networks B, C and E, respectively. Further, network F is connected to network E. Such network topology information can be provided from a server providing routing information base (RIB) information.

Referring to FIG. 3, when a certain client sends a request for content, the peer-list-generation unit 320 can generate a peer list to be provided to the client. For this, the peer-list-generation unit 320 can refer to the stored network topology information.

Specifically, the peer-list-generation unit 320 can retrieve an autonomous network closest to an autonomous network including the client that has sent a request for content among autonomous networks managed by the server 300. The network distance can be defined as a hop count between autonomous networks. For example, in FIG. 4, the hop count between network A and network B is 1, and the hop count between network A and network D is 2. Likewise, the hop count between network A and network F is 4. As illustrated in FIG. 4, as the hop count decreases, the network distance gets shorter. If the hop count between autonomous networks is the same, the network distance is the same.

Further, as a result of retrieving autonomous networks closest to the autonomous network including the client that has sent a request for content, a plurality of networks can be retrieved. For example, as in FIG. 4, if a client that has sent a request for content is included in network A, as the network closest to network A, networks B, C and G can be retrieved because the hop count between networks A and B, the hop count between networks A and C, and the hop count between networks A and G are the same and the hop count is 1. Likewise, in the case where the number of retrieved autonomous networks is plural, the peer-list-generation unit 320 can select an arbitrary autonomous network among the retrieved autonomous networks.

Then, the peer-list-generation unit 320 can retrieve a client sharing requested content among the selected autonomous networks.

As a result of retrieving clients within the selected autonomous network, in the case where there is no client sharing the requested content, the peer-list-generation unit 320 can select an autonomous network second-closest to the autonomous network including the client that has requested content. For example, in the case where network G is selected among networks B, C and G, there is no client sharing the requested content. Here, the peer-list-generation unit 320 can select one of networks B and C.

As a result of retrieving clients between selected autonomous networks, if there is a client sharing the requested content, the peer-list-generation unit 320 can add the client to the peer list. For example, in FIG. 4, if network B has been selected among networks B, C and G, the peer-list-generation unit 320 can add client b1, among clients included in network B, to the peer list.

Then, the peer-list-generation unit 320 can determine whether the number of clients included in the peer list is the same as a specified number. As a result, if the number of clients included in the current peer list is not the same as the specified number (i.e., if the number of clients included in the current peer list is less than the specified number), the peer-list-generation unit 320 can determine whether there is another client sharing the content among the selected autonomous networks.

As a result of the determination, if there is no other client sharing content, the peer-list-generation unit 320 can select an autonomous network second-closest to the autonomous network including the client that has requested content. For example, in FIG. 4, it is assumed that client b1 of network B has been added to the peer list. Here, a client sharing the requested content does not exist any more in network B. Hence, the peer-list-generation unit 320 can select network C.

As a result of the determination, if there is another client sharing the requested content among the selected autonomous networks, the peer-list-generation unit 320 can add the client to the peer list. For example, in FIG. 4, it is assumed that only c1 of network C has been added to the peer list. Here, there is a client sharing content in network C. Hence, the peer-list-generation unit 320 can add one of clients c2 and c3 to the peer list.

Further, if the number of clients included the current peer list is the same as the specified number, the peer-list-generation unit 320 can provide the peer list to the requested client.

Referring to FIG. 3, the interface unit 330 can exchange data with a client 500. For example, the interface unit 330 can receive a content-request signal from the client 500, and transmit the peer list generated by the peer-list-generation unit 320 to the client that has requested content in response to the signal.

Figure 5:
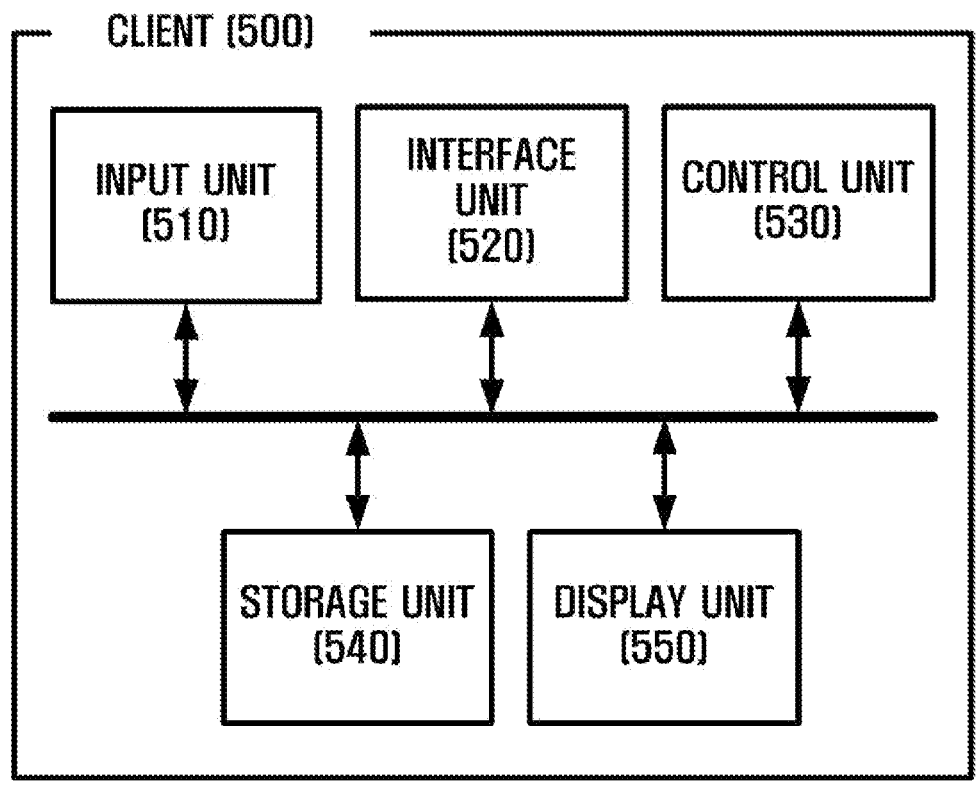
FIG. 5 illustrates the configuration of a client according to an exemplary embodiment of the present invention.

FIG. 5 illustrates the configuration of the client 500 according to an exemplary embodiment of the present invention. As illustrated, the client 500 includes an input unit 510, interface unit 520, a control unit 530, a storage unit 540, and a display unit 550.

The input unit 510 can receive an input command to download content from a user. For this, the input unit 510 can have multiple keys, and the keys can be implemented as hardware or software.

The interface unit 520 can exchange data with the server 300. For example, the interface unit 520 can transmit a content-request signal to the server 300, and can receive a peer list from the server 300 in response to the signal. The peer list can include information of clients close to the client that has requested the content among the clients sharing the content.

The control unit 530 can control the interface unit 520 in order to connect to clients included in the peer list. If the connection is made with the client included in the peer list, the control unit 530 can obtain portions of the requested content from each connected client.

The storage unit 540 can store the peer list received from the server 300 or content obtained from other clients. The storage unit 540 can be implemented as one of nonvolatile memory devices such as a cache, ROM, PROM, EPROM, EEPROM, flash memory, volatile memory devices such as RAM, and storage media such as a hard disk drive, but is not limited thereto.

The display unit 550 can display the result of the execution of a command. For example, the display unit 550 can display information of clients included in the peer list, or the content-downloading state.

Figure 6:
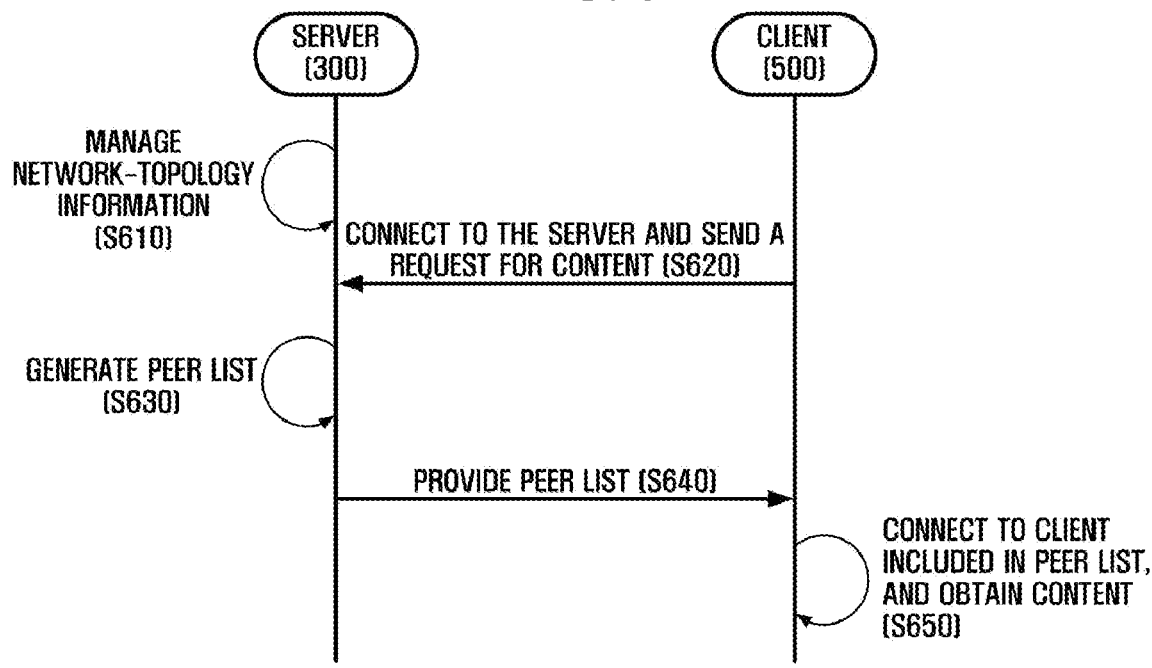
FIG. 6 is a flowchart illustrating the process of downloading content according to an exemplary embodiment of the present invention.

FIG. 6 is a flowchart illustrating the process of downloading content according to an exemplary embodiment of the present invention.

First, a server manages information of all clients participating in the P2P service for each autonomous network to which the clients belongs (S610).

Next, if a certain client 500 connects to the server 300, and sends a request for content (S620), the server 300 generates a peer list including information of clients closest to the client 500 that has sent a request for content (S630). Step S630 of generating the peer list will be described in more detail later with reference to FIG. 7.

When the peer list is generated, the server 300 provides the peer list to the client 500 (S640).

The client 500 that has received the peer list can connect to clients included in the peer list, and obtain portions of the requested content (S650).

Figure 7:
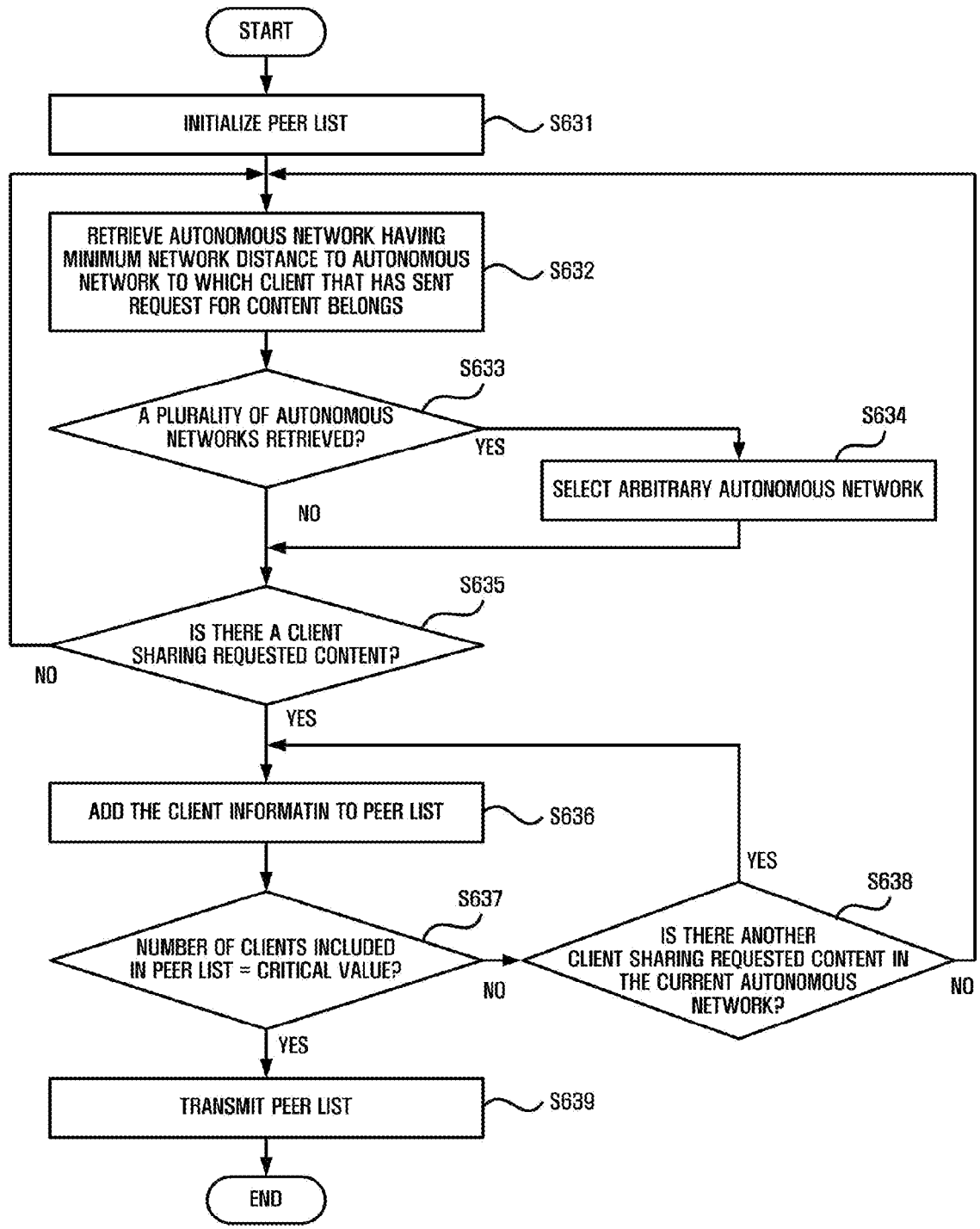
FIG. 7 is a flowchart illustrating step S630 of generating the peer list of FIG. 6 in detail.

FIG. 7 is a flowchart illustrating step of generating the peer list (S630) of FIG. 6 in detail. For explanatory convenience, it is assumed that the network topology information is the same as that of FIG. 4, and client a1 is connected to the server 300, and a request for content has been sent.

First, the peer-list-generation unit 320 of the server 300 initializes the number of clients that can be included in the peer list to 0 (S631).

Then, the peer-list-generation unit 320 refers to the advanced network topology information, and retrieves an autonomous network closest to network A including client a1 among autonomous networks managed by the server 300 (S632). As a result of the retrieval, autonomous networks B, C and G can be retrieved. Likewise, in the case where a plurality of autonomous networks are retrieved (yes in S633), the peer-list-generation unit 320 can select an arbitrary autonomous network among the retrieved autonomous networks (S634). The case where autonomous network G is selected is illustrated in the following.

Then, the peer-list-generation unit 320 retrieves clients sharing the requested content among clients included in autonomous network G S635.

In the case of autonomous network G, there is no client sharing the requested content (no in S635). Here, the peer-list-generation unit 320 repeats steps S631 to S634, and selects another autonomous network close to autonomous network A. The case where autonomous network B is selected is illustrated in the following.

If a client sharing the requested content is retrieved among clients included in network B (yes in S635), the peer-list-generation unit 320 adds the retrieved client to the peer list S636. For example, in the case of network B, because client (500) b1 is sharing the requested content, the peer-list-generation unit 320 can add information of client b1 to the peer list.

Then, the peer-list-generation unit 320 determines whether the number of clients 500 included in the current peer list is the same as the specified critical value, for example, 5 (S673).

As a result, the number of clients 500 included in the current peer list is 1, which is different from the critical value 5 (no in S637). Hence, the peer-list-generation unit 320 determines whether there is any other client 500 sharing the requested content within network B S638.

In the case of network B, there is no other client 500 sharing the requested content (no in S638). Hence, the peer-list-generation unit 320 repeats steps S631 to S634, and selects another network close to network A, for example, network C.

In the case where there is another client 500 sharing the requested content (yes in S638), the peer-list-generation unit 320 repeats steps S635 to S638, and adds another client to the peer list.

If network C is selected, the peer-list-generation unit 320 repeats steps S635 to S638.

In step S635, if the number of clients 500 included in the peer list is 5 (yes in S637), the peer-list-generation unit 320 controls the interface unit 300 so that the peer list can be provided to client a1 S639.

As another exemplary embodiment, a server and a client that generate a peer list necessary for downloading content will be described based on the data-transmission speed between autonomous networks with reference to FIGS. 8 to 11 in the following.

Figure 8:
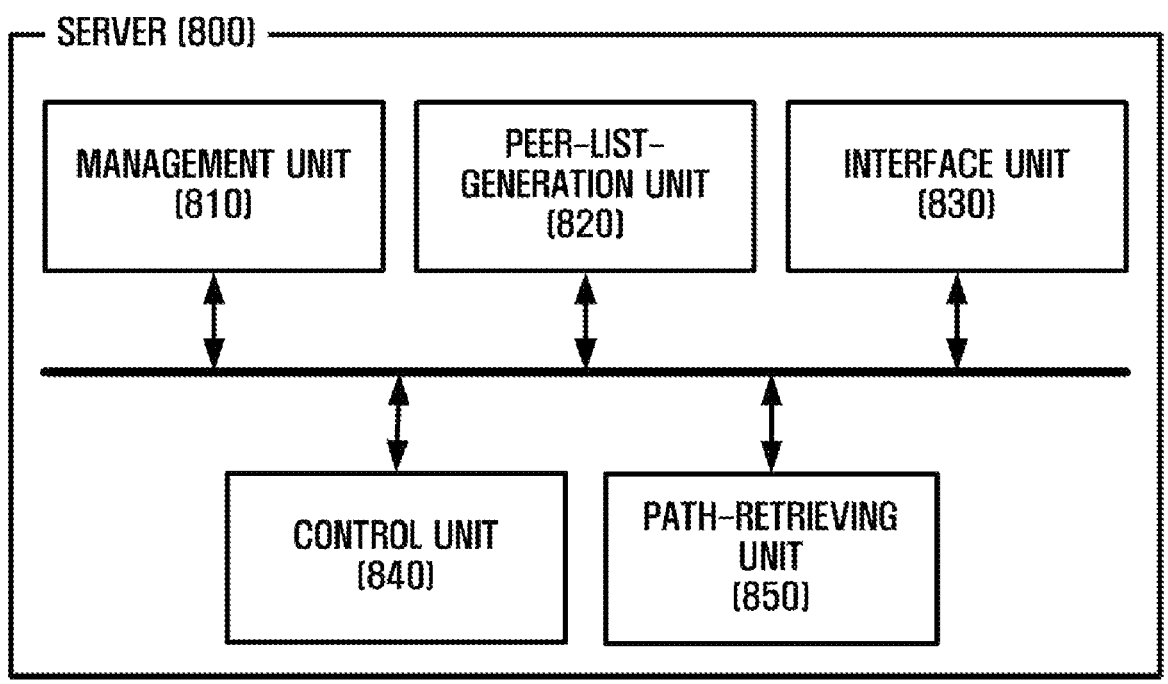
FIG. 8 illustrates the configuration of a server according to an exemplary embodiment of the present invention.
Figure 9:
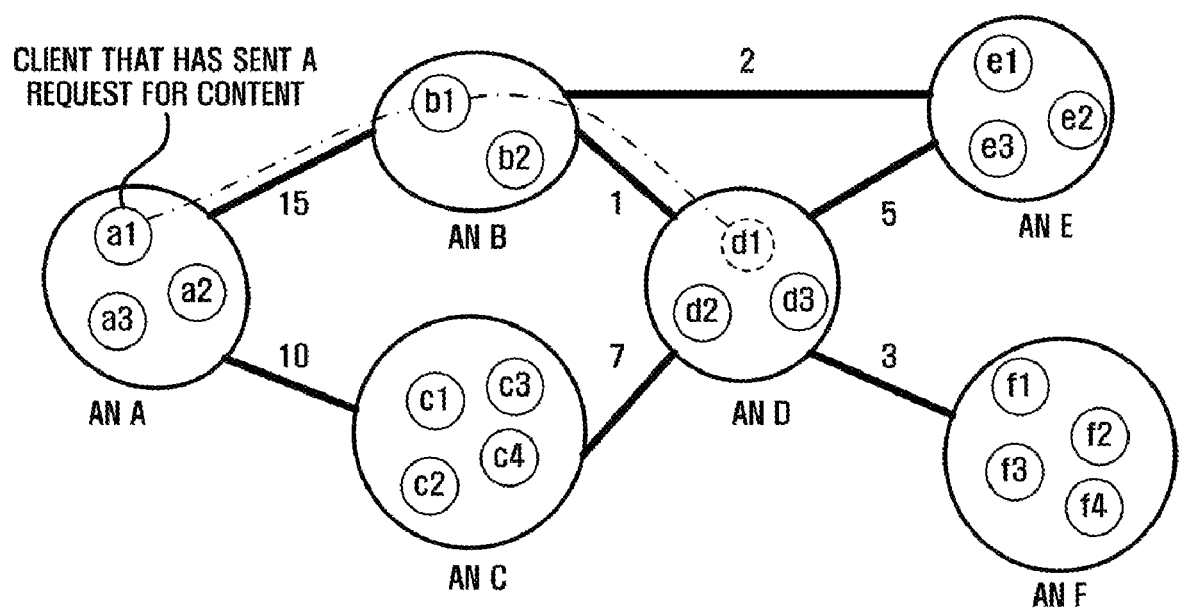
FIG. 9 illustrates network-topology information applied to an exemplary embodiment of the present invention.

FIG. 8 illustrates the configuration of a server 800 according to a second exemplary embodiment. As illustrated, the server 800 according to the second exemplary embodiment includes a management unit 810, a control unit 840, a path-retrieving unit 850, a peer-list-generation unit 820, and an interface unit 830.

Figure 10:
FIG. 10 illustrates a ping table according to an exemplary embodiment of the present invention.

The management unit 810 can manage network topology information between autonomous networks, and information of all clients participating in the P2P service. Here, the management unit 810 can classify and manage information of each client for autonomous networks to which the clients belong. That is, if the client (refer to reference numeral 900 of FIG. 11) connects to the server 800, the IP address of the client can be obtained, and the management unit 810 can manage information of clients participating in the P2P service for autonomous networks by determining the type of the autonomous networks to which the clients belong. Further, the management unit 810 can manage a ping table 10. The ping table 10 can include the result of the ping between clients included in different autonomous networks. The ping table 10 can be used to check the network state between two autonomous networks, that is, the data-transmission speed. Likewise, the network state between the autonomous networks is checked because the communication delay occurring when data is transmitted between autonomous networks is longer than the communication delay occurring when data is transmitted between clients within the same autonomous network. FIG. 10 illustrates a ping table 10 that can be generated when the network topology information between autonomous networks is the same as that of FIG. 9.

In order to generate the ping table 10 of FIG. 10, first, a client needs to be selected from each autonomous network. Here, the client can be selected by the control unit 840, and the control unit 840 can select an arbitrary client from each autonomous network. For example, in the case where the network topology information managed by the server 800 is the same as that of FIG. 9, in order to measure the transmission speed between autonomous networks A and B, the control unit 840 selects an arbitrary client from autonomous networks A and B, respectively, and informs the selected clients of the selection. Then, the selected clients can ping each other, and transmit the result, that is, the ping response speed, to the server 800. For example, if client a1 and client b1 have been selected from autonomous network A and autonomous network B, the result (e.g., 15 ms) can be provided to the server 800. Likewise, the result of the ping received from the client can be recorded in the ping table 10. The control unit 840 can generate the ping table of FIG. 10 by selecting clients on all autonomous networks managed by the server 800.

The control unit 840 can update the ping table 10 by repeating the selection of clients periodically, for example, at 10-minute intervals. As another example, the control unit 840 can update the ping table in the case where a new client connects to the server 800. Specifically, when a new client connects to the server 800, if the new connected client is included in the autonomous network managed by the server 800, the control unit 840 may not select the client for the ping. If the new connected client is connected through a new autonomous network, not the existing autonomous network, the control unit 840 can store information of the new connected client, and then select the client for the ping.

In the case where a certain client sends a request for shared content, the path-retrieving unit 850 can retrieve the path to minimize the content-downloading time. For this, the path-retrieving unit 850 can retrieve the autonomous network to which the clients sharing content belong. For example, it is assumed that the content requested by client a1 is shared by client d1. Here, autonomous network D can be retrieved as a result of the retrieval (hereinafter, for explanatory convenience, the client that has requested content is called a "first client", and the client sharing the requested content is called a "second client").

Then, the path-retrieving unit 850 can retrieve the path that connects the autonomous network to which the first client belongs, and the retrieved autonomous network with reference to network topology information. For example, the path-retrieving unit 850 can retrieve all paths connecting autonomous network A to which client a1 belongs, and autonomous network D to which client d1 belongs. Here, as paths connecting network A and network D, three paths can be retrieved: A first path including network A-network B-network D; a second path including network A-network C-network D; and a third path including network A-network B-network E-network D.

Then, the path-retrieving unit 850 can select the shortest path having the minimum communication delay among the retrieved paths with reference to the stored ping table 10. That is, the path-retrieving unit 850 can sum up communication delays between autonomous networks existing on a predetermined path, and select the path having the minimum result as the shortest path. For example, in the case where the ping table 10 is the same as that of FIG. 10, the first path can be selected as the shortest path among the first, second and third paths because in the case of the second and third paths, the results of summing up the communication delays between autonomous networks on the paths are 17 (=10+7) and 22 (=15+2+5), but in the case of path 1, the result of summing up the communication delays between autonomous networks is 16 (=15+1), which is the minimum.

If the shortest path is selected, the path-retrieving unit 850 can select a client of autonomous networks, exempting autonomous networks including the first client and the second client, among autonomous networks existing on the shortest path. For example, in the case where the first path is the shortest path, a client can be arbitrarily selected from network B, exempting networks A and D (FIG. 10 shows the case where client b1 is selected from network B). Further, the path-retrieving unit 850 transmits the command from network B to the selected client, and the client selected form network B can transmit data between the first client and the second client.

With reference to FIG. 8, the peer-list-generation unit 820 can generate a peer list including information on the shortest path.

The interface unit 830 can exchange data with the clients. For example, the interface unit 830 can receive a content-request signal from the first client, or transmit the peer list including information on the shortest path to the first client.

Figure 11:
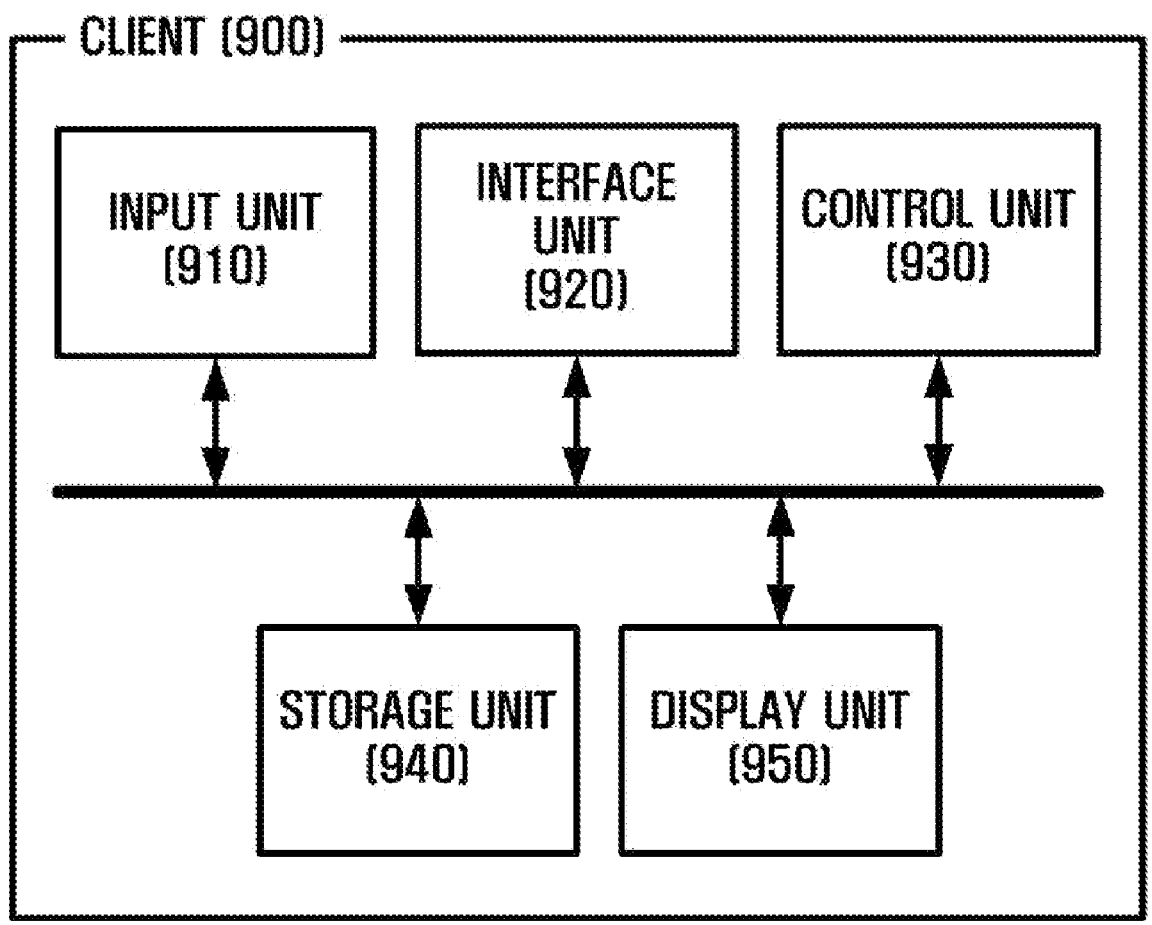
FIG. 11 illustrates the configuration of a client according to an exemplary embodiment of the present invention.

FIG. 11 illustrates the configuration of a client 900 according to another exemplary embodiment of the present invention.

The client 900 according to the embodiment includes an input unit 910, an interface unit 920, a control unit 930, a storage unit 940, and a display unit 950. Because the operations of the input unit 910, the storage unit 940 and the display unit 950 of FIG. 11 are the same as those of the input unit 510, the storage unit 540 and the display unit 550 of FIG. 5, the description will be omitted, and the control unit 930 and the interface unit 920 will be mainly described.

The control unit 930 can ping another client selected by the server 800. In the case where the client is selected as an intermediate point, the control unit 930 delivers data transmitted from the first client to the second client, or delivers data transmitted from the second client to the first client.

The interface unit 920 can exchange data with the server 800. For example, the result of the ping can be provided to the server 800. Further, the interface unit 920 can transmit a content-request signal to the server 800 according to the user's command, and can receive the peer list in response to the signal. Here, the peer list can include information on the shortest path for receiving the content. The received shortest-path information can be stored in the storage unit 940.

Figure 12:
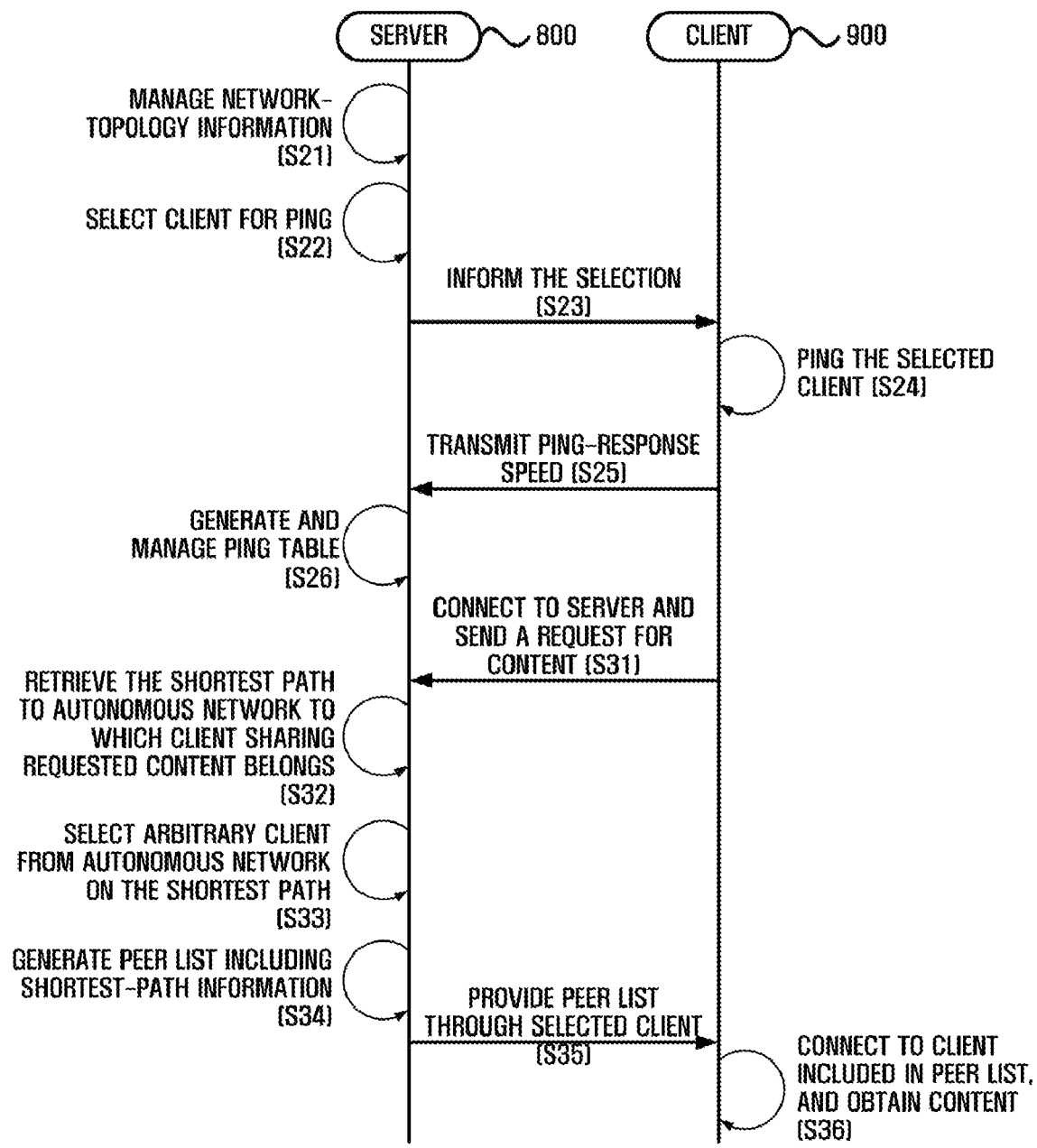
FIG. 12 is a flowchart illustrating the process of downloading content according to an exemplary embodiment of the present invention.

FIG. 12 is a flowchart illustrating the process of downloading content according to another exemplary embodiment of the present invention.

First, the management unit of the server 800 stores and manages all clients participating in the P2P service (S21).

Then, the control unit 840 of the server 800 selects clients for the ping (S22). That is, the control unit 840 refers to the stored network topology information, arbitrarily selects a client from the autonomous network to which clients participating in the P2P service belong, respectively, and informs the selected clients of the selection (S23).

The selected clients ping each other (S24), and provide the ping-response speed to the server 800 (S25).

The ping-response speed received form each client is recorded in the ping table 10, and is managed by the server (S26). Here, the clients can be periodically selected for the ping, and the ping is also possible in the case where the client connected to the server 800 is connected through a new autonomous network, not the existing autonomous network managed by the server 800.

Further, if a certain client 900 connects to the server 800, and sends a request for content (S31), the server 800 retrieves the shortest path between the autonomous network to which the first client belongs, and the autonomous network to which the second client belongs (S32). The retrieving of the shortest path includes retrieving all paths connecting the autonomous network to which the first client belongs, and the autonomous network to which the second client belongs, adding up the ping-response speeds between autonomous networks existing in the path by the retrieved paths, and selecting the path having the minimum value as the shortest path among the results of the addition.

If the shortest path is retrieved, the server 800 selects an arbitrary client among autonomous networks existing on the short path, exempting the autonomous network to which the first client belongs, and the autonomous network to which the second client belongs (S33), and sets the client to the intermediate point necessary for exchanging data between the first client and the second client.

Further, the server 800 generates the peer list including information on the shortest path (S34), and provides the peer list to the first client (S35).

The first client, which receives the peer list from the server, connects to the client included in the peer list, and obtains the requested content (S36).

It should be understood by those of ordinary skill in the art that various replacements, modifications and changes may be made in the form and details without departing from the spirit and scope of the present invention as defined by the following claims. Therefore, it is to be appreciated that the above described embodiments are for purposes of illustration only and are not to be construed as limitations of the invention.

According to the apparatus and method of the present invention, because content can be provided through the peer whose network distance or communication delay is a minimum, the download speed can increase.

What is claimed is:

1. An apparatus for transmitting data, the apparatus comprising:
    a management unit that manages network-topology information of clients participating in peer-to-peer (P2P) service;
    an interface unit that provides to a first client a peer list including information of a plurality of clients having a minimum network distance to the first client, based on the network topology information, when receiving a request for content from the first client; and
    a peer-list-generation unit that generates the peer list,
    wherein the interface unit provides the peer list to the first client in the case where a number of clients included in the peer list is the same as the predetermined value,
    wherein the peer-list-generation unit determines whether a number of clients within the peer list is identical to a predetermined value,
    wherein the peer-list-generation unit adds information of a second client to the peer list in a case where there exists the second client sharing the content in the at least one second autonomous network having the minimum network distance to a first autonomous network to which the first client belongs,
    wherein the peer-list-generation unit adds to the peer list information of a third client sharing the content in at least one third autonomous network having a second-shortest network distance to the first autonomous network next to the at least one second autonomous network in the case where a number of clients included in the peer list is less than the predetermined value.

2. The apparatus of claim 1, wherein the management unit manages the network-topology information according to autonomous networks including the clients participating in the P2P service.

3. The apparatus according to claim 2, wherein the network-topology information comprises connection-structure information between the autonomous networks.

4. The apparatus of claim 1, wherein the peer list includes information of the plurality of clients having the minimum network distance to the first client among clients sharing the content.

5. The apparatus of claim 4, wherein the peer-list-generation unit adds to the peer list information of a third's client sharing the content in at least one third autonomous network having a second-shortest network distance to a first autonomous network next to at least one second autonomous network in a case where there does not exist a second client sharing the content in the at least one second autonomous network having the minimum network distance to the first autonomous network to which the first client belongs.

6. The apparatus of claim 1, wherein the network distance is determined by a hop count between autonomous networks including the clients.

7. An apparatus for transmitting data, the apparatus comprising:
an interface unit that receives a peer list generated by at least one of the network distance between autonomous networks to which clients participating in peer-to-peer (P2P) service belong, and a result of measuring data-transmission speed between the autonomous networks from a server; and
a control unit that receives the requested content by connecting to the client included in the peer list,
wherein the peer list includes information of a plurality of clients, and
wherein the interface unit provides the peer list to the first client in the case where a number of clients included in the peer list is the same as the predetermined value,
wherein the peer-list-generation unit adds information of a second client to the peer list in a case where there exists the second client sharing the content in the at least one second autonomous network having the minimum network distance to a first autonomous network to which the first client belongs,
wherein the peer-list-generation unit adds to the peer list information of a third client sharing the content in at least one third autonomous network having a second-shortest network distance to the first autonomous network next to the at least one second autonomous network in the case where a number of clients included in the peer list is less than the predetermined value.

8. The apparatus of claim 7, wherein the network distance is determined by a hop count between the autonomous networks.

9. The apparatus of claim 7, wherein the result of measuring the data-transmission speed is a ping-response time between clients selected in two different autonomous networks.

10. A method of transmitting data, the method comprising:
managing network-topology information of clients participating in a peer-to-peer (P2P) service;
generating a peer list;
determining whether a number of clients within the peer list is identical to a predetermined value; and
providing to a first client a peer list including information of a plurality of clients having a minimum network distance to the first client, based on the network-topology information when receiving a request for content from the first client, in a case where a number of clients included in the peer list is the same as the predetermined value,
wherein the peer-list-generation unit adds information of a second client to the peer list in a case where there exists the second client sharing the content in the at least one second autonomous network having the minimum network distance to a first autonomous network to which the first client belongs,
wherein the peer-list-generation unit adds to the peer list information of a third client sharing the content in at least one third autonomous network having a second-shortest network distance to the first autonomous network next to the at least one second autonomous network in the case where a number of clients included in the peer list is less than the predetermined value.

11. The method of claim 10, wherein the managing of the network-topology information includes managing by autonomous networks including the clients participating in the P2P service.

12. The method of claim 10, wherein the peer list includes information of the plurality, of clients having the minimum network distance to the first client among clients sharing the content.

13. The method of claim 12, wherein the generating of the peer list includes: retrieving at least one third autonomous network having a second-shortest network distance to the first autonomous network next to at least one second autonomous network in a case where there does not exist a second client sharing the content in the at least one second autonomous network having the minimum network distance to the first autonomous network to which the first client belongs; and adding to the peer list information of a third client sharing the content among clients belonging to the at least one third autonomous network.

14. The method of claim 10, wherein the network distance is determined by a hop count between autonomous networks to which the clients belong.

15. A method of transmitting data, the method comprising:
receiving a peer list generated by at least one network distance between autonomous networks to which clients participating in a peer-to-peer (P2P) service belong, and a result of measuring data-transmission speed between the autonomous networks from server; and
receiving a requested content by connecting to the clients included in the peer list, in a case where a number of clients included in the peer list is the same as the predetermined value wherein the peer list includes information of a plurality of clients,
wherein the peer-list-generation unit adds information of a second client to the peer list in a case where there exists the second client sharing the content in the at least one second autonomous network having the minimum network distance to a first autonomous network to which the first client belongs,
wherein the peer-list-generation unit adds to the peer list information of a third client sharing the content in at least one third autonomous network having a second-shortest network distance to the first autonomous network next to the at least one second autonomous network in the case where a number of clients included in the peer list is less than the predetermined value.

16. The method of claim 15, wherein the network distance is determined by a hop count between the autonomous networks.

17. The method of claim 15, wherein the result of measuring the data-transmission speed is a ping-response time between clients selected from two different autonomous networks.

* * * * *